June 7, 1966 J. M. BURNETT 3,254,376
MOLD TRANSPORTING SYSTEM

Original Filed May 16, 1961 7 Sheets-Sheet 5

INVENTOR.
JOEL M. BURNETT
BY
Oberlin, Maky & Donnelly
ATTORNEYS

June 7, 1966     J. M. BURNETT     3,254,376
MOLD TRANSPORTING SYSTEM Original Filed May 16, 1961     7 Sheets-Sheet 6

INVENTOR.
JOEL M. BURNETT
BY
Oberlin, Maky & Donnelly
ATTORNEYS

June 7, 1966  J. M. BURNETT  3,254,376
MOLD TRANSPORTING SYSTEM

Original Filed May 16, 1961  7 Sheets-Sheet 7

INVENTOR.
JOEL M. BURNETT
BY
Oberlin, Maky & Donnelly
ATTORNEYS

United States Patent Office 3,254,376
Patented June 7, 1966

3,254,376
MOLD TRANSPORTING SYSTEM
Joel M. Burnett, Chagrin Falls, Ohio, assignor, by mesne assignments, to Bartlett-Snow-Pacific, Inc., a corporation of California
Continuation of application Ser. No. 110,578, May 16, 1961. This application Oct. 30, 1964, Ser. No. 407,918
12 Claims. (Cl. 22—20)

This application is a continuation of application Serial No. 110,578, filed May 16, 1961, now abandoned, in the name of Joel M. Burnett, entitled "Mold System."

This invention relates to a mold system in which molds are handled in groups and the groups thereof advanced or processed as separate working units through the various work stations called for by molding therewith.

A primary object of the invention is thus to provide means for assembling a plurality of molds in a defined group to form a basic and effective separate or independent working unit capable of being transported as such and employed for casting, with the group to be formed initially and maintained intact throughout pouring and cooling, as necessary, of metal in the several molds comprising the same.

Another object of the invention is to provide a system constructed and arranged for handling a substantial number of groups of molds with every high operational efficiency and maximum utilization of available floor space. Such handling of molds in separate groups makes the system extremely flexible and also economical, since it is possible, for example, to handle different types and sizes of molds in this system at the same time, to pour separate groups of molds with metal of different analysis or even entirely different metals, and to schedule the progress or advance of the groups through the various work zones with some degree of independence to absorb or effectively eliminate delays in production.

It is also an object to provide such a system for handling the output of a substantial number of high production molding machines and, particularly, to provide for such handling with a single transfer agency or means for advancing the molds in groups through the successive work zones of the system. This obvious simplification and economy of equipment is basically realized by the use of such transfer means capable of handling one or more groups of molds, rather than one mold at a time.

An additional object is to provide such a system which is highly flexible with regard to cooling time, to the extent that molds requiring extremely long cooling times can be run or processed along with others requiring very little cooling time, without interfering with the over-all production rate of the system.

It is a further object of the invention to provide a pallet of special construction on which a plurality of molds is assembled to form a working unit or group thereof in the system noted above, with such pallet constituting the unifying means of the group and the apparatus of the system being keyed to or constructed and arranged with reference to the processing of molds in groups on pallets of this nature.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
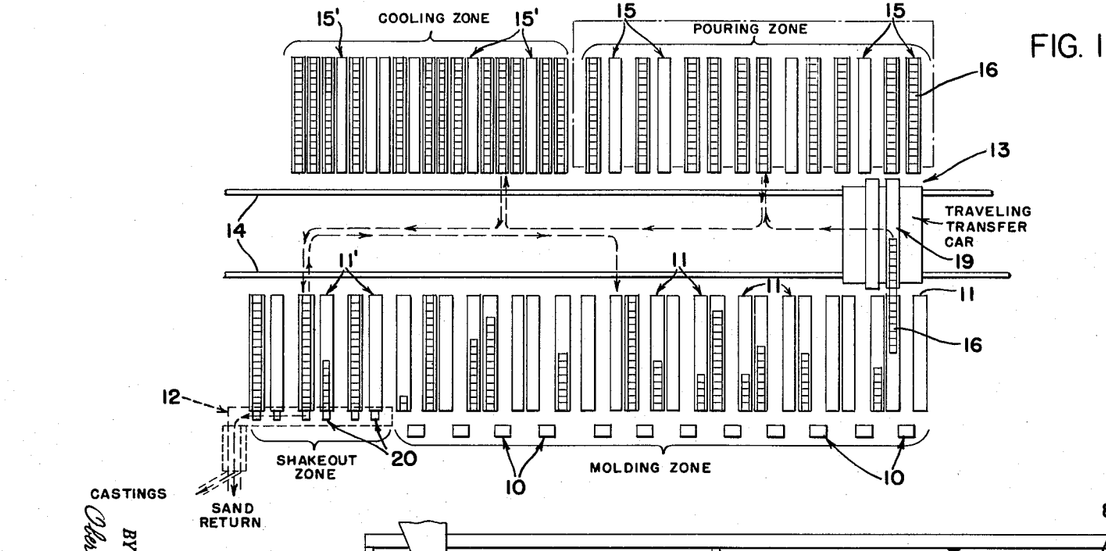
FIG. 1 is a simplified and largely schematic plan of a mold system in accordance with the present invention.

Referring now to the drawings in detail, the new mold system comprises generally, as shown in FIG. 1, a line of molding machines 10 of conventional type and a series of stationary conveyor sections 11 in a molding zone in which the molds are produced and set out in a manner later to be described in detail. The several stationary conveyor sections 11 are arranged in parallel relation and disposed, as shown, so that the outer ends of two sections are adjacent each molding machine 10 in the series and accordingly a pair of such sections is available to serve each such machine.

At one end of the molding zone, the left end in the system arrangement shown in FIG. 1, there is a shakeout zone including a number of stationary conveyor sections 11' which may be of the same construction as the sections 11. The former are parallel to the latter, and mold shakeout mechanism indicated generally by the dashed box 12 is located at the outer ends of the conveyor sections 11' in this further zone, with suitable provision for separate discharge of the castings and the sand as shown by the legends and of course understood in the art. The molding and shakeout zones thus form one side or half of the system, and a transfer car 13 is movable on rails 14 along the length thereof at the inner boundary of the side or, in other words, past the inner ends of the several parallel stationary conveyor sections 11 and 11' in both the molding and shake-out zones.

The second half of the system is disposed at and extends along the other side of the track defined by the rails 14 and comprises side-by-side pouring and cooling zones. The pouring zone, which commences at the same end as the molding zone, includes a series of stationary conveyors 15 and similar conveyors 15' are provided in the cooling zone, the latter being closely adjacent the inner end of the pouring zone. All of these conveyors 15 and 15' are in parallel relation and at right angles to the transfer car track, this last relation also holding for the conveyors or conveyor sections 11 and 11' at the other side in the molding and shakeout zones.

The dashed arrows in FIG. 1 represent a given flow path of molds in the system, which should desirably be understood before detailed description of the special apparatus employed. As an example of the system operation, then, the FIG. 1 representation shows a plurailty of molds 16 produced at the exereme right molding machine 10 and set upon a pallet 17, to be later described, supported on the left hand stationary conveyor 11 of the pair provided to serve this particular molding machine. When the pallet is filled with the molds, a clamp 18 is used to prevent movement of the same thereon, and the pallet is moved onto a transverse conveyor section 19 of the transfer car 13 aligned with the stationary conveyor 11, the drawing showing this group of molds in the process of being so moved. When the mold group has thus been loaded on the transfer car, the latter is advanced on the rails 14 to register its conveyor section 19 with an empty conveyor section 15 in the pouring zone and the mold-pallet unit is transferred from the car to such empty section for pouring of metal in the molds.

After pouring of the molds in the group considered, with or without weights as required, the group is returned to the transfer car 13 and moved thereby to an open or empty stationary section 15' in the cooling zone and inserted in the same. After the molds on the pallet have been cooled the proper length of time, the transfer car is again utilized to advance the group from the cooling zone to the shakeout zone, on an empty stationary conveyor section 11' of the latter. In this last zone, the molds 16 on the pallet are unclamped and moved, one at a time, from the pallet to a tilting device 20 which deposits the mold on a shakeout of suitable conventional design. If snap flask molds are used, the bottom boards are held on the tilting device or table, with the sand and castings dumped on the shakeout surface to be separated, and the bottom boards returned to the other end of the pallet. If tight flasks are used, the entire flask is advanced onto the shakeout surface where the sand and casting are removed, and the empty flask is picked up and returned to the other end of the pallet. The pallet, now carrying bottom boards or empty flasks, is then returned by the transfer car to one of the open conveyor sections 11 in the molding zone for further use.

It will be appreciated not only that several groups of molds on pallets will be handled at the same time, as individual units, but that there can and ordinarily will be some overlapping of the handling of different groups for maximum utilization of the facilities. For example, the transfer car, having two or more pallet-receiving conveyor sections, can be used to effect different transfers in the same traverse, such as transfer of one mold group from the pouring zone to the cooling zone and another from the latter to the shakeout zone, and so forth. In other words, the use of the transfer car 13 in particular will be directed with regard to conditions at all of the stations or zones for the highest possible working efficiency at any given time.

Much of the apparatus in the system is conventional and need not be described in detail; it should be apparent now that the present improvements are particularly concerned with the apparatus for directly handling the molds and other equipment has been illustrated only to the extent of unconventional features and particular relations to the handling devices. The basic new handling component is of course the pallet 17 the preferred construction of which appears in FIGS. 3 to 8, together with a stationary conveyor section 11 in operative association therewith.

Figures 7, 8:
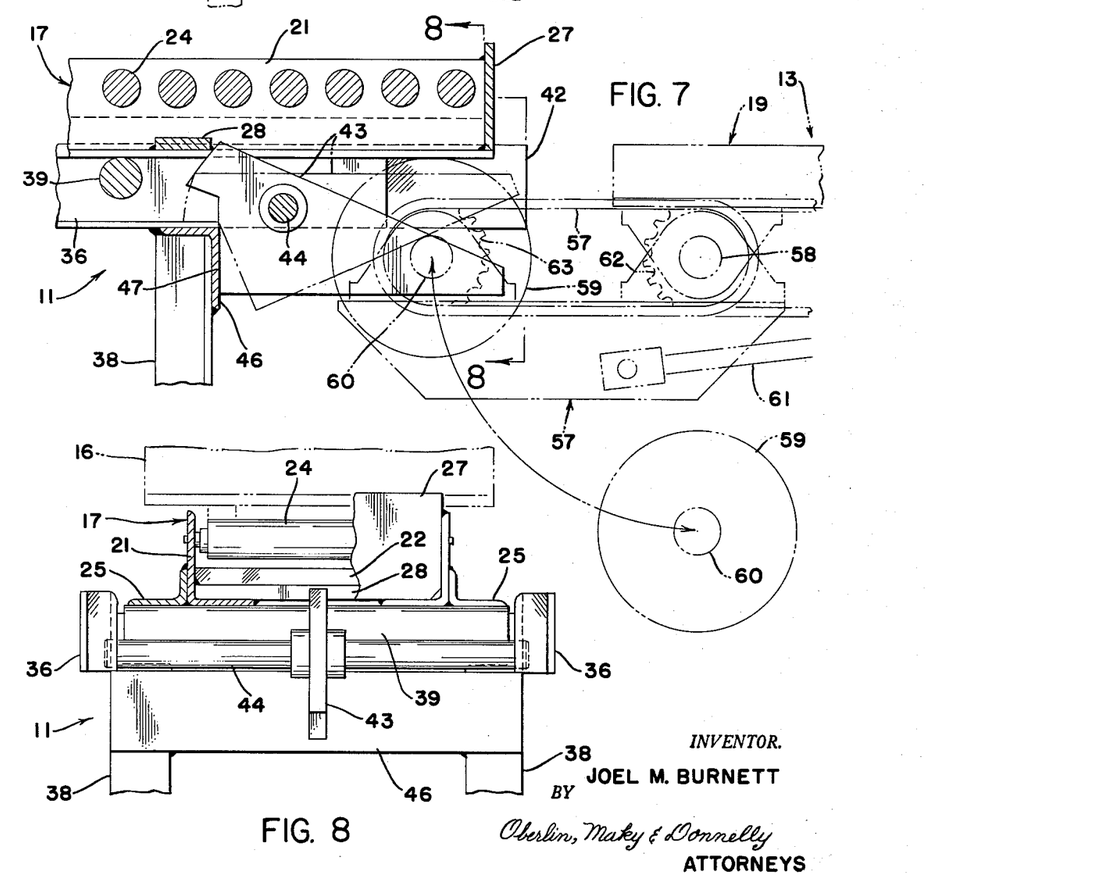
FIG. 7 is a fragmented longitudinal section, also on a relatively enlarged scale, of the right end portion of the assembly shown in FIGS. 3 and 4.
FIG. 8 is a transverse section taken approximately on the line 8—8 in FIG. 7.

The pallet itself comprises a rectangular frame 21 of considerable length having a number of inverted angles 22 secured to extend transversely between the sides of the frame in suitable spaced relation to rigidify the structure and maintain these long sides in parallelism. A series of longitudinally spaced apart parallel axles 23 are supported by the frame sides in the same plane and generally in the upper or top portion of the frame. A roll 24 is mounted on each axle between the frame sides, on suitable bearings, with the diameter and separation such that the several rolls are closely spaced over the entire length of the pallet 17. As best shown in FIG. 8, angles 25, welded along the bottom edges of the frame sides respectively at the outer sides of the same, form, cooperably with inturned flanges of the frame sides, fairly wide bottom runners.

Figure 3:
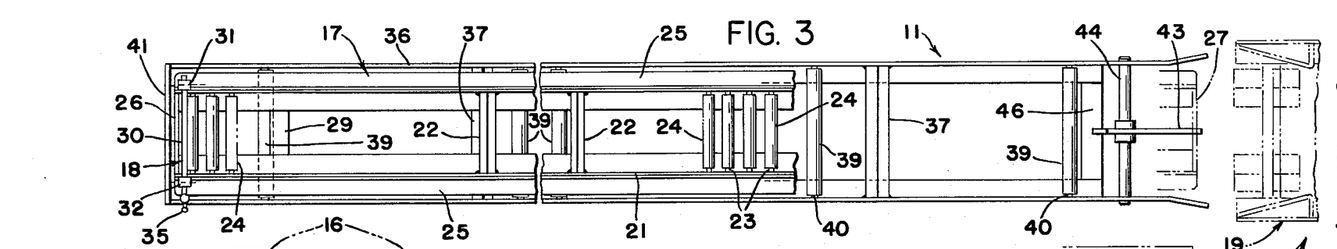
FIG. 3 is a top plan view of a pallet employed in the system and shown supported on a stationary conveyor section.
Figure 4:
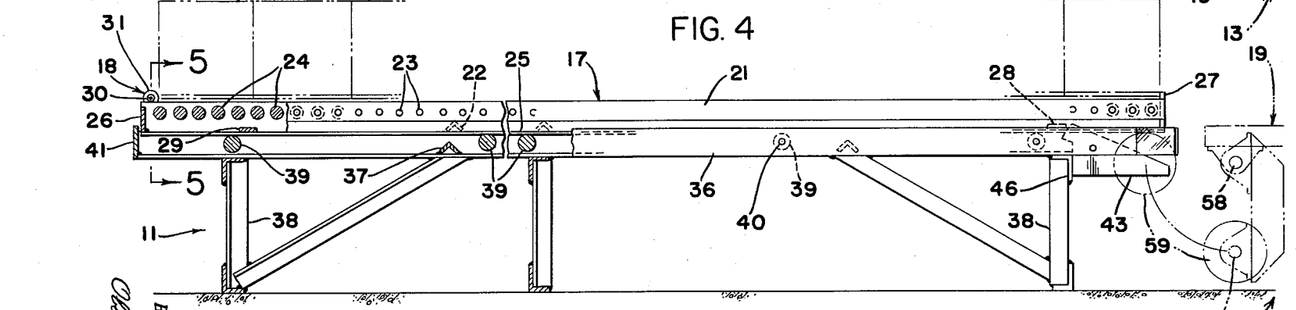
FIG. 4 is a side elevational view of the FIG. 3 assembly.
Figure 5:
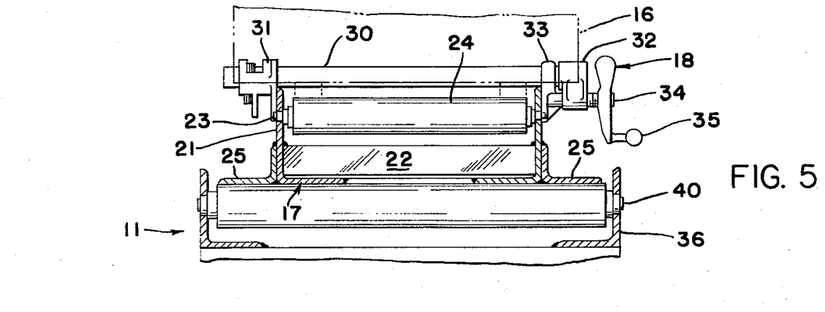
FIG. 5 is a transverse sectional view, on an enlarged scale, taken on the line 5—5 in FIG. 4.
Figure 6:
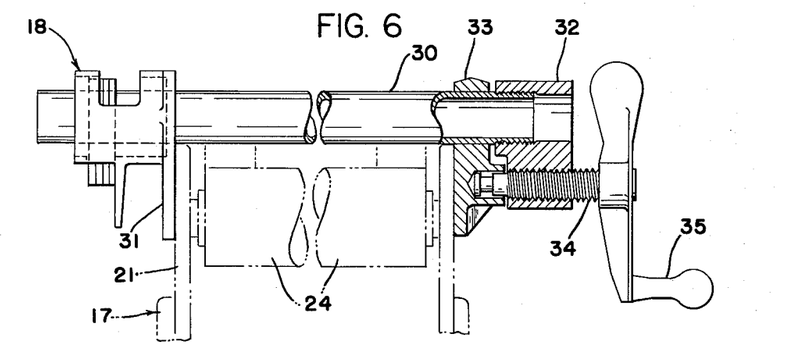
FIG. 6 is a further enlarged elevation of a clamp used in association with the pallet, the clamp being shown broken and partially in section.

One end member 26 of the pallet frame, at the left as viewed in FIG. 4, is of reduced height, so that its top edge is below the upper surfaces of the rolls 24. The other frame end member 27, however, is of increased height and projects above the rolls to serve additionally as a stop element. For a purpose to be described, there is a transverse bottom bar 28 at one end portion of the frame 21, and a similar bar 29 is located adjacent the other frame end. As indicated by the dashed outlines in FIG. 4, the pallet is adapted to receive a plurality of flasks 16, with each flask deposited thereon conveniently adjacent the open end, where the member 26 occurs, and pushed along the rolls 24 to the other end. The first thus deposited flask will be moved against and stopped by the projecting other end member 27 with successively added flasks moved into abutment, ordinarily until the pallet has been completely filled in this manner. From what has been said earlier, it will be appreciated that a group of molds from one of the molding machines 10 is thus formed in the molding zone, and the group is locked on the roller surface of the pallet by means of the clamp 18, best shown in FIG. 6. Such clamp comprises a pipe 30 carrying a depending fixture 31 at one end and a nut 32 at its other end. Inside the nut on the pipe is a collar 33 mounting a lead screw 34 which extends through the nut and has an outer hand wheel 35. It will be apparent that this clamp is engaged over the sides of the pallet 17 across the top and behind the last flask 16 thereon, as shown in FIG. 3, and tightened in place by the lead screw removably to restrain the flasks from moving off this feed end of the pallet.

The stationary conveyor section 11 shown in the figures considered also comprises a rectangular frame 36 with transverse stiffeners 37, and such frame is supported in substantially horizontal elevated condition by means of legs 38. The frame is provided with a plurality of transverse rolls 39 mounted on bearings on axles 40 in longitudinally spaced relation. The conveyor section frame 36 is wider than the pallet 17 and the length of the conveyor rolls 39 approximately the same as the bottom width of the pallet thereby to support and receive the latter. The molds 16 are thus on a roller surface of the pallet 17, while the pallet itself is here supported on a roller conveyor section 11. The end 41 of such conveyor section 11 in this embodiment at which the open end 26 of the pallet 17 occurs is of sufficient height that the former serves as a stop for the latter.

At its other end 42, the stationary conveyor section is provided with a movable stop 43 on a transverse shaft 44, said stop being movable into and away from its locking position shown in FIG. 7. In such locking position, the inner end portion of the stop 43 is elevated to be engaged by the bar stop 28 of the pallet 17, thereby to preclude movement of the pallet off this end of the stationary conveyor section. The stop is held in such locking position by abutment with a transverse frame member 46 below the top conveyor frame as indicated at 47, and it will be clear that force applied to the outer end of the stop operative to rotate the same in the reverse or counterclockwise direction will withdraw the inner end portion from engagement with the pallet stop bar 28. Such release condition of the stop is shown by the dashed outline in FIG. 7, with such reverse rotation limited by engagement of the inner end of the stop with the top of the transverse frame 46. Accordingly, the pallet 17 is inserted in the stationary conveyor section 11 lengthwise from the open or releasably stopped end, at the right in FIG. 4, and moved along the conveyor rolls 39 until stopped by the other end 41 of the section. The pivoted stop 43 is placed so that the outer end pallet stop bar 28 clears the same, whereupon the stop pivots by its weighting into its noted locked position to hold the pallet against further movement on the stationary conveyor section until deliberately released.

Figure 9:
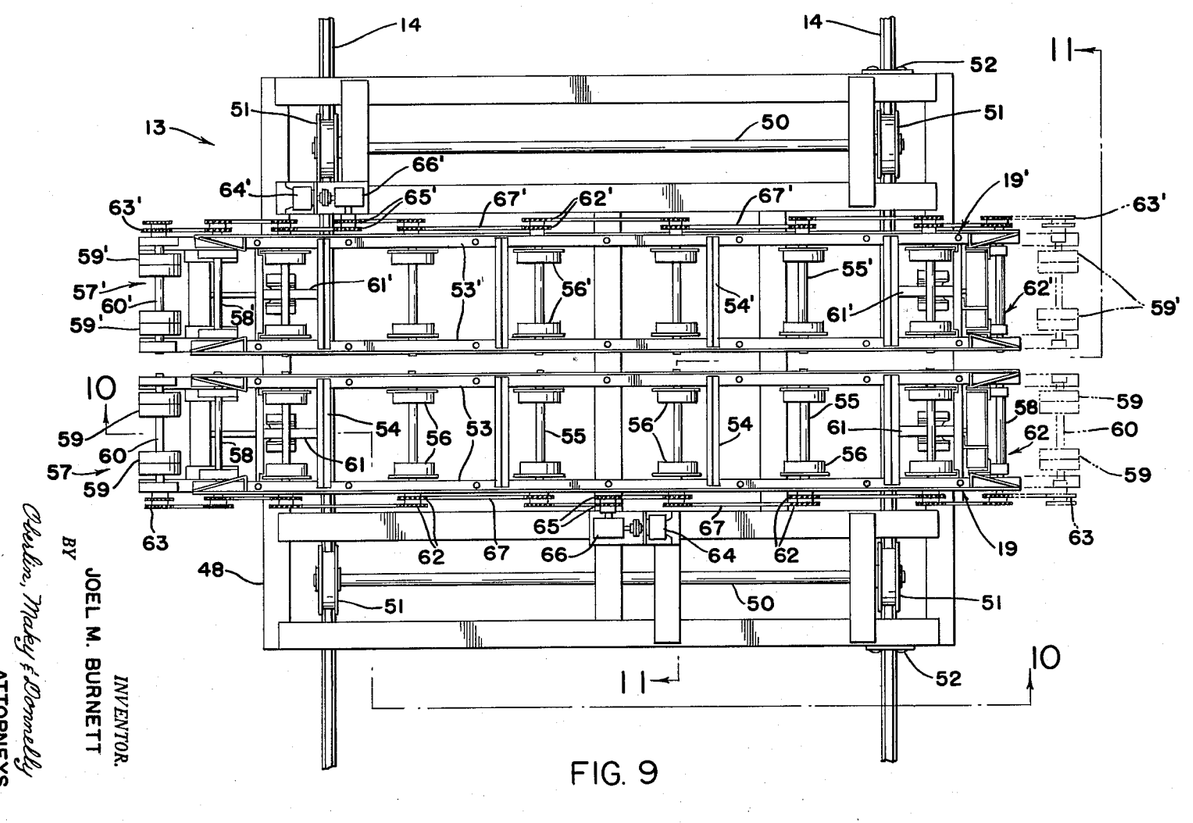
FIG. 9 is a top plan view of transfer car structure utilized in the new system.
Figure 10:
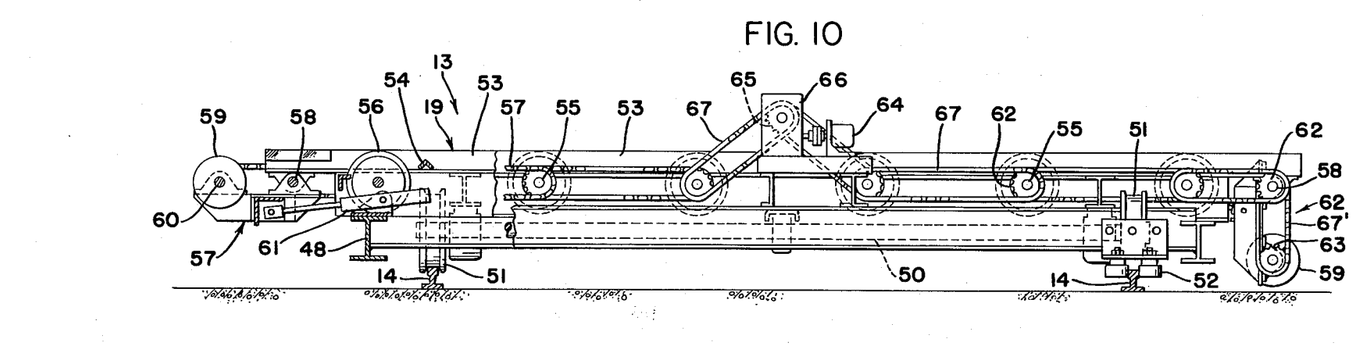
FIG. 10 is a view taken approximately on the line 10—10 in FIG. 9 and accordingly partially in elevation and partially in section.
Figure 11:
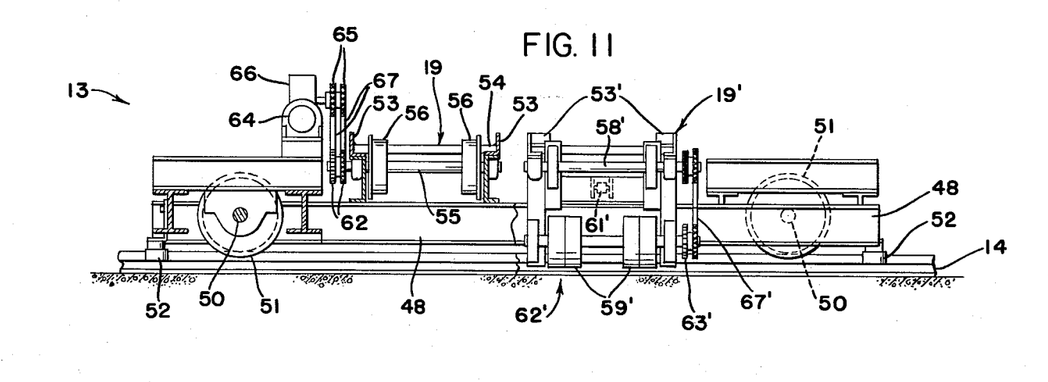
FIG. 11 is a view taken on the line 11—11 in FIG. 9 and similarly both in elevation and section.

The next significant piece of equipment in the system is the transfer car 13 which may vary in a number of respects but should preferably include the features shown in FIGS. 9–11. Such car comprises a carriage 48 having a pair of axles 50 and wheels 51 thereon for riding on the rails 14. At one side, the carriage also carries fore and aft pairs of guide rolls 56 at this side for lateral stability. The carriage would ordinarily include power or drive means, not shown, with either local or remote control, but could also be moved manually on the rails.

In the illustrated embodiment, the transfer car is provided with first and second elongated and transversely arranged conveyor sections, 19 and 19′ respectively, with the ends thereof projecting at both sides of the carriage 48. Since the two such sections are the same, it will suffice to describe only one. The conveyor section 19 thus comprises an elongated rectangular frame made up of parallel side pieces 53 and transverse members 54. A series of longitudinally spaced shafts 55 are rotatably supported in and between the sides, and two flanged wheel 56 are mounted on each shaft. At the left end of the section, as seen in FIGS. 9 and 10, there is a retractable table 57 connected to the section proper through a transverse shaft 58 and carrying outer rolls 59 on a rotatably mounted shaft 60. A piston-cylinder assembly 61, of hydraulic or pneumatic type, is operatively connected between the transfer car carriage 48 and the retractable table 57, with this assembly being operative to bring and hold the table to a horizontal working position or to release the same for swinging to a vertical released or retracted position, it being understood that a suitable fluid pressure system will be employed for such control.

The table 57 just considered, that is at the left end of the section 19 in the noted figures, is in its horizontal working position, in which its wheels or rolls 59 are at the same elevation as the conveyor wheels 56. A duplicate table assembly is provided at the other end of the section, with the same here in its retracted condition and its corresponding working position being shown in dashed lines in FIG. 9. The shafts 55 and 58 of the conveyor section 19 have a pair of sprockets 62 at their ends outboard of the section, while the retractable table shafts 60 have single sprockets 63 on their corresponding ends. A fluid motor 64 is mounted on the carriage 48 to drive another pair of sprockets 65 through a clutch and speed reducer unit 66. All the sprockets noted are interconnected by chains, such as the chains 67, in the manner illustrated to drive the several shafts and hence the wheels 56 and 59 in one direction or the other. The transfer car thus has two power conveyor sections, with the only variation being that the motor drive 64′ for the other conveyor 19′ is not in exactly the same location on the carriage as the centered drive 64 but to one side as shown.

The purpose and mode of operation of the retractable tables at the ends of the transfer car conveyors 19 and 19′ will be readily apparent from consideration of the dashed outlines of the table 57 in FIGS. 3, 4 and 7. As thus shown, the transfer car conveyor 19 has been moved into alignment with the stationary conveyor section 11 on which the mold-bearing pallet 17 is supported, with the pallet locked on the stationary conveyor section by the pivoted lock member 43 previously described. In such relative positioning of the stationary and transfer car conveyors, the retractable table 57 at the adjacent end of the latter is in its retracted or substantially vertical position, and the table is then swung by its piston-cylinder assembly 61 upwardly to its substantially horizontal working condition. The arrangement is such that the shaft 60 of the table when thus moved upwardly engages the outer end of the stationary conveyor stop or latch member 43 and rocks the same to its pallet release position, shown by the dashed outline in FIG. 7, while the power wheels 59 of the table are brought into engagement with the bottom of this end portion of the pallet 17 now free to move longitudinally off the stationary conveyor section.

Accordingly, the transfer car is operative in the manner set forth to collect or take on a pallet 17 for transfer of the same to another stationary conveyor section, which may be either at the same or opposite side of the system. As mentioned, the drive of the conveyors 19 and 19′ on the transfer car 13, both being the same, is reversible, and each is provided with a similary operative retractable table at both ends to afford this flexibility of transfer operation. The particular steps involved in such collection and delivery of a pallet by means of the transfer car can obviously be controlled in any suitable manner and can, if desired, be made substantially fully automatic by utilizing limit switches responsive to retractable table and pallet movement for determining the drive of the transfer car conveyors. After a pallet is loaded on the transfer car 13, the retractable table used for such operation will ordinarily be retracted and this or the retractable table at the other end subsequently utilized for delivery of the pallet to the further stationary conveyor section.

Figure 2:
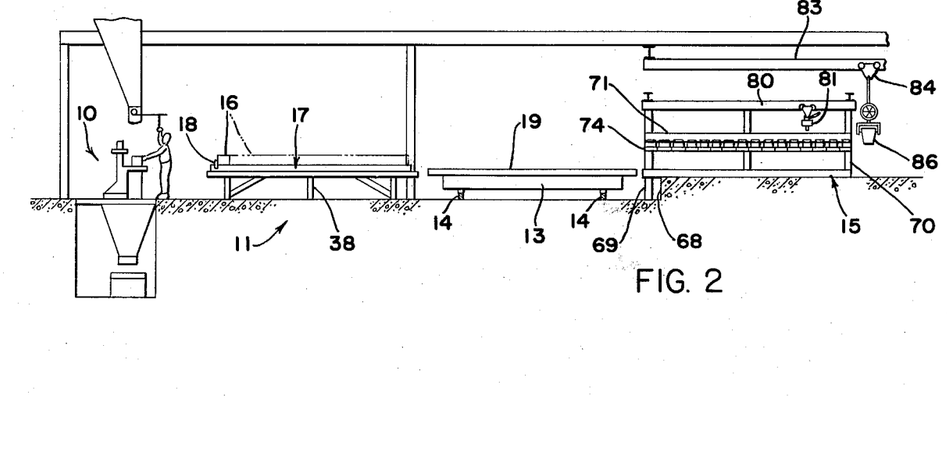
FIG. 2 is an end view of the system also somewhat simplified for convenience of illustration and understanding.

It is in this manner that the representative pallet 17 carrying a group of molds 16 produced and assembled thereon in the molding zone is transferred to the pouring zone, with an illustrative section of the latter shown in FIG. 2 and in more detail in FIGS. 12–15. Such section comprises two stationary roller conveyors 15 on a suitable elevated base 68 and constructed to receive mold-bearing pallets 17 inserted lengthwise, from the transfer car 13, in the same. That is, the typical section considered is of dual nature, but this is for structural convenience and the two halves of sides of the section respectively receiving different groups of molds are independently equipped for pouring of the same.

Inner and outer end posts 69 and 70, respectively, extend upwardly from the base between the two conveyor sections 15 and support a pair of horizontal channels 71 at the first elevation above the conveyor sections and the pallet supported molds 16 on the same. Each such channel is provided with outwardly and downwardly projecting brackets 72 which support a substantially unobstructed hanger rod 73 in such lower outward relation, with the two such rods being substantially coextensive with the stationary conveyors and hence the two groups of molds in the section. Such rods removably support mold weights 74 in number corresponding with the molds for storage of the former until used on the latter.

Figure 12:
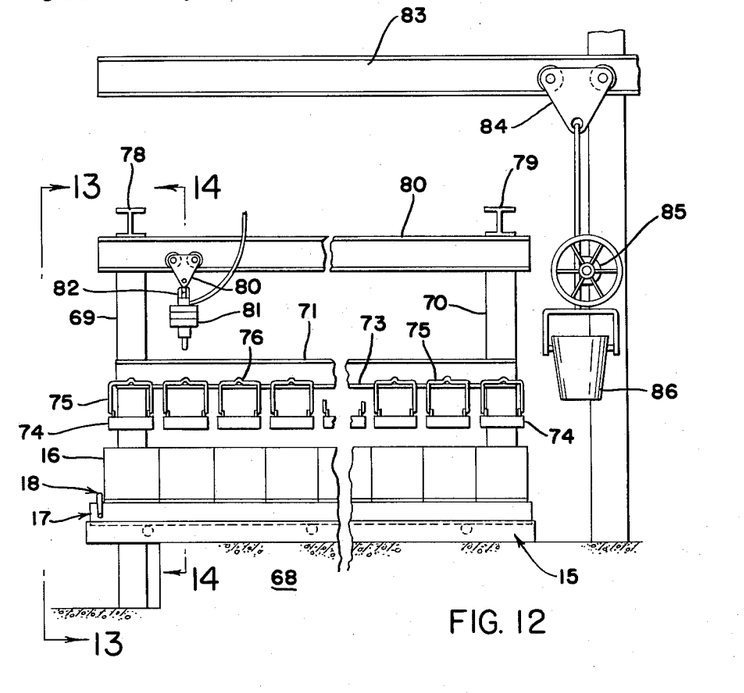
FIG. 12 is a side elevation of a pouring station of the system.
Figure 13:
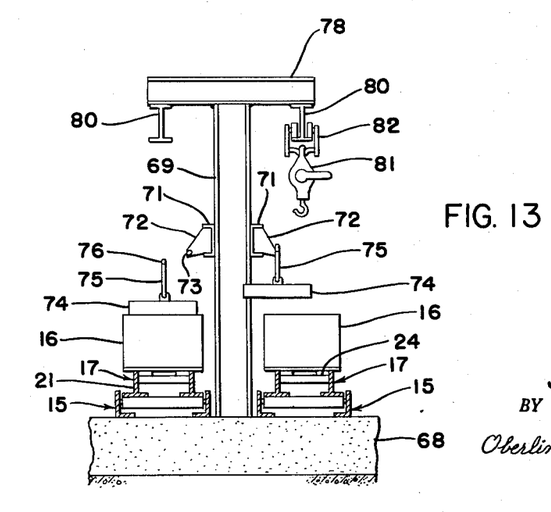
FIG. 13 is an end view of such station as indicated by the line 13—13 in FIG. 12.
Figures 14, 15:
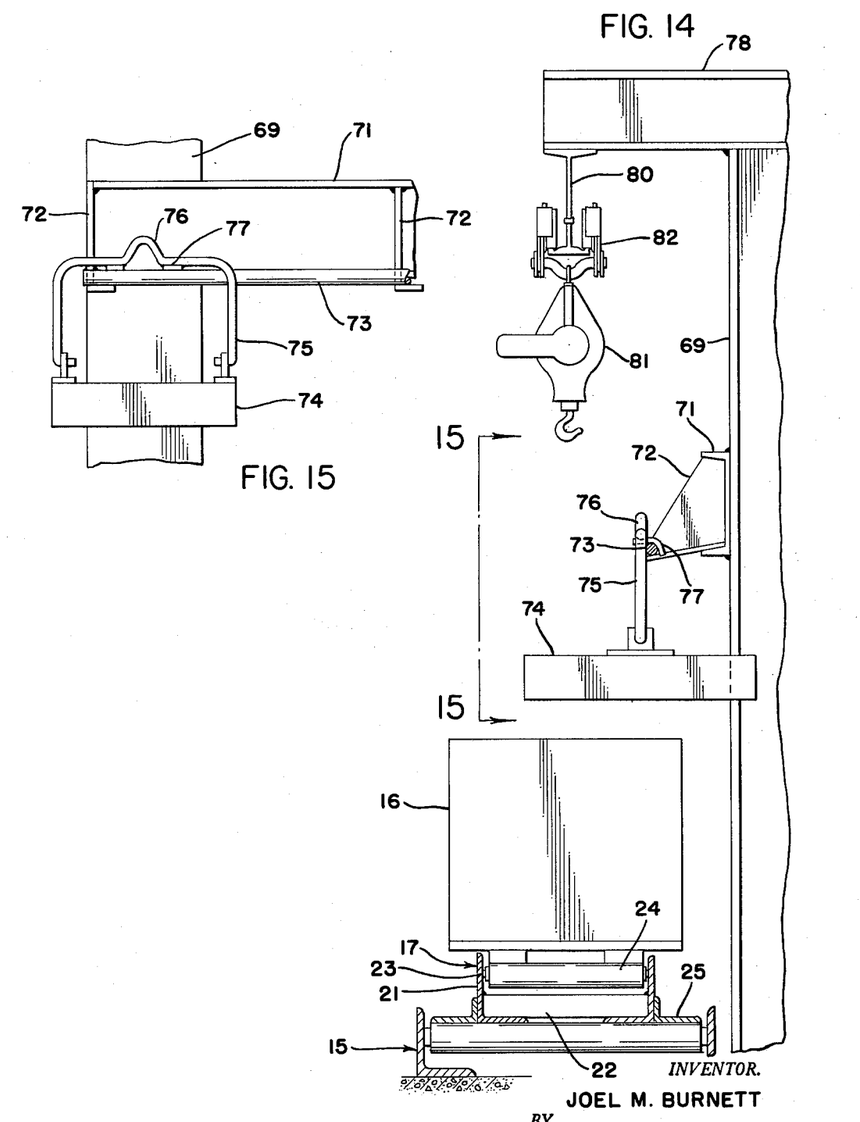
FIG. 14 is a fragmented view of a portion of the pouring station on an enlarged scale, approximately at the plane of the line 14—14 in FIG. 12.
FIG. 15 shows a further section of the pouring station structure in elevation as indicated by the line 15—15 in FIG. 14.

Each such mold weight 74 is provided with a bail 75 having a top center lifting loop 76 and a pair of laterally projecting curved hangers 77 to engage around the associated support rod 74. In FIG. 12, for example, these several mold weights at this side are all shown thus suspended by their hanger means form the support rod; the left mold in FIG. 13 is shown lowered and resting on a flask. The posts 69, 70 supporting such weight assemblies also support inner and outer cross pieces 78, 79 and a pair of horizontal beams 80 are secured between the corresponding ends of the latter at a higher elevation. A conventional air hoist 81 is reciprocably mounted on each beam 80 by means of a wheeled carrier 82 and is thus capable of traverse above the line of mold weights 74 at the same side of the section. It will be appreciated that each side is thus equipped with a crane for handling the associated mold weights, with the crane operable to lift each such weight by its bail from its storage position and lower the same on the particular mold thereteneath. After all the molds of the particular group have been weighted and poured, the weights are lifted by the hoist 81 from the molds and returned to their suspended storage positions.

A pouring crane 83 will extend at a still higher elevation over the pouring section to serve the same, with such pouring section typically provided with a wheeled carriage 84 and depending hoist 85 for carrying a bucket 86 of the molten metal. The metal can be supplied to the bucket thus utilized in the pouring zone by any convenient arrangement, and a number of traveling overhead cranes of this nature provided to serve a block of pouring sections.

It will be understood that operation of the system may not require weighting of the molds, this factor depending upon the kind of molds employed, the type of castings, and the hydraulic force of the poured metal. Where mold weights are utilized, as described herein, it may not be possible in some cases to remove the weights promptly after pouring, and, in this event, the weights will remain on the flasks through transfer to the cooling zone, with provision made for removal and return to the pouring zone by suitable handling or conveying means.

The cooling zone is essentially comprised of a plurality of stationary roller conveyor sections 15' and similarly functional roller conveyor sections 11' are employed in the shakeout zone as earlier described. The small boxes 20 at the respective outer ends of these last conveyor sections 11' represent tilt tables which are conventional per se. After unclamping of the group of poured and now cooled molds 16, still on the pallet 17 on which they were first assembled, the molds are individually moved off the outer end and onto the associated tilt table 20 which tips to dump the same on the shakeout surface. The remaining steps have already been described, and it is not necessary to understanding of the present improvements to set forth in detail further equipment employed in the system, such as conveyors for handling the sand and castings, the sand storage bin, and the arrangement for delivery of the sand to the battery of molding machines.

With further regard to the system proper, it should also be appreciated that all of the work zones could be arranged in a single row if this would better suit the available space than the arrangement shown in which such zones are at both sides of the transfer car track. The use of two stationary roller conveyor sections 11 at each molding station is advantageous, the operator thereby being able to turn to a second empty pallet after filling of the other with molds. While such second pallet is being filled, the transfer car 13 would be operated to remove the first filled pallet and replace it with an empty one.

The roller surface of the transfer pallet, which might be realized with wheels as well as long rolls, is clearly important in permitting the molds to be easily moved for loading and unloading, while suited for transfer and further handling of a group of molds as a unit thereon. The next important consideration is the provision of rolling contact of the individual pallets and the various conveyor sections which receive the same in the manner discussed, and this might also be accomplished by providing bottom wheels or rollers on the pallets for engagement with rails and the like in the conveyor sections; that is, the rollers of the latter could in this manner be functionally replaced with additional bottom rollers on the pallets.

Other modes of applying the principle of the invention may be employed, change being made as regards the details described, provided the features stated in any of the following claims or the equivalent of such be employed.

I therefore particularly point out and distinctly claim as my invention:

1. In apparatus of the character described, a pallet adapted to support a plurality of mold flasks, said pallet comprising a series of roller elements freely rotatable on laterally spaced parallel axes, said roller elements being thus arranged in a row of considerable length, with their axes transverse therein, and forming an elongated upper flask-supporting surface of the pallet, flask stop means at one end of such row of roller elements the other end of which is normally unobstructed, whereby flasks can readily be deposited at such other end and moved on the roller elements along the row to form a line group of flasks on the pallet, with the first positioned flask restrained from moving beyond the one end of the row by the stop means, lock means for releasably locking the last flask of a thus formed group to the pallet to preclude reverse flask movement on the roller elements until release of said lock means, pallet support means for supporting the pallet without interference with the roller elements thereof, further roller elements between the pallet and said pallet support means for ready movement of the former on the latter, first stop means on the pallet support means for limiting such movement of the pallet in one direction, and second stop means for releasably limiting pallet movement on the support means in the opposite direction.

2. In a mold handling system, a pallet comprising a rectangular frame of substantial length, a plurality of rollers mounted freely for rotation within and transversely of the frame, said rollers being exposed at the top of the frame and adapted to support mold flasks placed thereon, a stop at one end of the frame projecting above the rollers to arrest such a mold flask deposited on and moved along the rollers to such one end, the length of the frame and roller assembly accommodating a number of flasks in a row thereon, means for releasably locking such a row of flasks on the pallet, an elevated support for receiving the pallet, said support having a series of rollers forming a conveyor section for lengthwise insertion and withdrawal of the pallet, and means for releasably locking the pallet to the support.

3. In a mold handling system, a pallet comprising a rectangular frame of substantial length, a plurality of rollers mounted freely for rotation within and transversely of the frame, said rollers being exposed at the top of the frame and adapted to support mold flasks placed thereon, a stop at one end of the frame projecting above the rollers to arrest such a mold flask deposited on and moved along the rollers to such one end, the length of the frame and roller assembly accommodating a number of flasks in a row thereon, means for releasably locking such a row of flasks on the pallet, an elevated support for receiving the pallet, said support having a series of rollers forming a conveyor section for lengthwise insertion and withdrawal of the pallet, means for releasably locking the pallet to the support, and carriage means mounting said pallet for movement thereon.

4. A mold system comprising an elongated pallet having a top roller surface for assembly and support of a line group of mold flasks thereon, means for releasably locking such an assembled flask group to the pallet for transport therewith, a stationary roll conveyor section supporting the pallet, with the latter being withdrawable lengthwise from the section, and transfer car means also having a roll conveyor section for support of the pallet, said transfer car means being adjustable to a position in which its roll section is in register with the stationary conveyor section for transfer of the pallet between the two.

5. A mold system comprising a stationary roll conveyor section, a pallet supported on said stationary roll conveyor section and having a top roller surface for deposit and movement of mold flasks therealong, stop means at one end of the stationary roll conveyor section to limit movement of the pallet in such direction, latch means at the other end of the section releasably precluding withdrawal of the pallet, with the latter inserted in and withdrawn lengthwise at such other end, means for releasably locking a group of molds deposited and assembled on the pallet to the same for movement therewith, transfer car means having a roll conveyor section for register with the stationary section at such other end of the same, and means on the transfer car means for releasing the latch means of the stationary section to permit the pallet to be withdrawn therefrom to the roll conveyor section of the transfer car means.

6. A mold system as set forth in claim 5 wherein the roll conveyor section of the transfer car means is power driven.

7. A mold system comprising an elongated pallet having a top roller surface for assembly and support of a line group of mold flasks thereon, means for releasably locking such an assembled flask group to the pallet, a plurality of stationary supports for the pallet adapted to be disposed at different work stations in the system, said stationary supports having rolls arranged in rows for lengthwise reception and withdrawal of the pallet, and transfer means having a roll section for similar reception and delivery of the pallet, said transfer means being movable to positions of register of its roll section respectively with the stationary support roll rows for transfer of the pallet from and to the same.

8. In a mold system having defined molding, pouring, cooling and shakeout zones; stationary roll conveyor sections at such different zones, a pallet having a top roller surface for support of a line group of molds thereon and being adapted for lengthwise insertion in and withdrawal from the stationary roll conveyor sections, with the mold group being formed on the pallet while supported on one of said stationary conveyor sections at the molding zone, means for releasably locking a thus formed mold group to the pallet for movement therewith, and transfer car means having a roll conveyor section for selective register with the stationary roll conveyor sections by movement of the transfer car means, said transfer car means being thus operative to move the pallet from one stationary section to another and thereby advance the same through the system.

9. A mold system as set forth in claim 8 wherein the roll conveyor section at the pouring zone is provided with a series of mold weights normally suspended over the same and with means for lowering said weights respectively on pallet-supported molds in the section.

10. A mold system as set forth in claim 8 wherein the roll conveyor section of the transfer car means is power driven.

11. In a mold system having defined molding, pouring, cooling and shakeout zones; stationary roll conveyor sections at such different zones, pallet means disposed at each of said zones, each of said pallet means having a top roller surface for support of a line group of molds thereon and being adapted for lengthwise insertion in and withdrawal from the stationary roll conveyor sections, means for releasably locking a thus formed mold group to each of said pallet means for movement therewith, and transfer car means having a roll conveyor section for selective register with the stationary roll conveyor sections, means for moving said transfer car, whereby any one of said pallet means can be moved from any one zone to any other of said zones by said transfer car means independently of the other of said pallet means.

12. A mold system comprising an elongated pallet in the form of a portable platform having a top roller surface for assembly and support of a line group of mold flasks thereon, means for releasably locking such an assembled flask group to the pallet, a stationary roll conveyor section for supporting the pallet with the latter movable lengthwise on and off the former and carriage means for receiving said pallet by such lengthwise movement of the same off said stationary roll conveyor section onto said carriage means, the carriage means being operable to transport said pallet when thus transferred thereto away from said stationary conveyor section.

References Cited by the Examiner

UNITED STATES PATENTS

| 1,900,149 | 3/1933 | Anderson | 193—35 |
| 1,936,376 | 11/1933 | Camerota | 22—64 |
| 2,095,151 | 10/1937 | O'Connor et al. | 22—20 |
| 2,970,672 | 2/1961 | Govoni | 193—35 |

FOREIGN PATENTS

| 1,090,391 | 10/1937 | Germany. |
| 289,610 | 3/1953 | Switzerland. |

MARCUS U. LYONS, *Primary Examiner.*